US009667329B2

(12) United States Patent
Kang et al.

(10) Patent No.: US 9,667,329 B2
(45) Date of Patent: May 30, 2017

(54) METHOD AND APPARATUS FOR REMOVING COUPLING BETWEEN ANTENNAS IN MULTI-ANTENNA BASED WIRELESS COMMUNICATION SYSTEM

(71) Applicant: LG ELECTRONICS INC., Seoul (KR)

(72) Inventors: Jiwon Kang, Anyang-si (KR); Kilbom Lee, Anyang-si (KR); Hyunsoo Ko, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 276 days.

(21) Appl. No.: 14/062,703

(22) Filed: Oct. 24, 2013

(65) Prior Publication Data

US 2015/0036763 A1 Feb. 5, 2015

(30) Foreign Application Priority Data

Jul. 31, 2013 (WO) ................ PCT/KR2013/006877

(51) Int. Cl.
*H04B 7/02* (2006.01)
*H04L 1/02* (2006.01)
*H04B 7/06* (2006.01)
*H04B 7/0413* (2017.01)

(52) U.S. Cl.
CPC ......... *H04B 7/0613* (2013.01); *H04B 7/0413* (2013.01)

(58) Field of Classification Search
USPC .......................... 375/267, 260; 370/335, 252
See application file for complete search history.

(56) References Cited

U.S. PATENT DOCUMENTS

| | | | |
|---|---|---|---|
| 2011/0158340 A1 | 6/2011 | Swanson | |
| 2011/0223876 A1 | 9/2011 | Kang | |
| 2012/0087346 A1* | 4/2012 | Lee | H04B 7/0473 370/335 |
| 2012/0113840 A1 | 5/2012 | Le Pezennec et al. | |
| 2013/0120191 A1* | 5/2013 | Zhang | H04B 7/0469 342/377 |

FOREIGN PATENT DOCUMENTS

| | | |
|---|---|---|
| KR | 10-2011-0001936 A | 1/2011 |
| KR | 10-2011-0103617 A | 9/2011 |
| KR | 10-2012-0112678 A | 10/2012 |

* cited by examiner

*Primary Examiner* — Wednel Cadeau
(74) *Attorney, Agent, or Firm* — Birch, Stewart, Kolasch & Birch, LLP (57) ABSTRACT

A communication apparatus in a multi-antenna wireless communication system is disclosed. In detail, the communication apparatus includes a first processor for processing a baseband signal defined as a first virtual antenna group, a second processor for mapping a signal defined as a second virtual antenna group and the baseband signal defined as the first virtual antenna group in order to remove coupling between antennas, and an antenna module for mapping the signal defined as the second virtual antenna group and a signal defined as a multiple physical antenna group.

7 Claims, 4 Drawing Sheets

METHOD AND APPARATUS FOR REMOVING COUPLING BETWEEN ANTENNAS IN MULTI-ANTENNA BASED WIRELESS COMMUNICATION SYSTEM

Pursuant to 35 U.S.C. §119(a), this application claims the benefit of PCT Patent Application No. PCT/KR2013/006877, filed on Jul. 31, 2013, which is hereby incorporated by reference as if fully set forth herein.

BACKGROUND OF THE INVENTION

Field of the Invention

The present invention relates to a wireless communication system, and more particularly, to a method and apparatus for removing coupling between antennas in a multi-antenna based wireless communication system.

Discussion of the Related Art

When a sufficient distance between physical antennas is not ensured, a phenomenon whereby current is induced in an antenna according to electromagnetic induction of current flowing in another antenna is referred to as antenna coupling.

Recently, as antenna systems have become increasingly sophisticated, multi-antennas have been widely used, and the number of antennas has increased. Intensity of antennas has also increased. Accordingly, it is very important to remove or control antenna coupling for design of antennas.

SUMMARY OF THE INVENTION

Accordingly, the present invention is directed to a method and apparatus for removing coupling between antennas in a multi-antenna based wireless communication system that substantially obviates one or more problems due to limitations and disadvantages of the related art, in particular, to a digital processor for minimizing influence of antenna coupling in an environment in which plural Tx antennas are geographically clustered.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a communication apparatus in a multi-antenna wireless communication system includes a first processor for processing a baseband signal defined as a first virtual antenna group, a second processor for mapping a signal defined as a second virtual antenna group and the baseband signal defined as the first virtual antenna group in order to remove coupling between antennas, and an antenna module for mapping the signal defined as the second virtual antenna group and a signal defined as a multiple physical antenna group.

The communication apparatus may further include a measurement module for calculating at least one parameter associated with characteristics of the multiple physical antenna group, wherein the second processor may map the signal defined as the second virtual antennas set and the baseband signal defined as the first virtual antenna group, based on the at least one parameter. However, the second processor may calculate the at least one parameter associated with the characteristics of the multiple physical antennas set.

In detail, the second processor may map the signal defined as the second virtual antennas set and the baseband signal defined as the first virtual antenna group according to Equation below:

<Equation>

$$X_2 = P \cdot X_1$$

where $X_1$ is the baseband signal defined as the first virtual antenna group, $X_2$ is the signal defined as the second virtual antenna group, and P is a processing matrix determined based on at least one parameter associated with characteristics of the multiple physical antenna group.

The first processor and the second process of the above communication apparatus may be configured as one processor. For example, the communication apparatus may include a processor for processing a baseband signal defined as a first virtual antenna group, and mapping a signal defined as a second virtual antenna group and the baseband signal defined as the first virtual antenna group in order to remove coupling between antennas, and an antenna module for mapping the signal defined as the second virtual antenna group and a signal defined as a multiple physical antenna group.

In another aspect of the present invention, a method of transmitting a signal by a transmitter in a multiple antenna wireless communication system includes generating a baseband signal using a first virtual antenna group, mapping the baseband signal to a signal corresponding to a second virtual antenna group in order to remove coupling between antennas, mapping the signal corresponding to the second virtual antenna group to a transmission signal corresponding to a multiple physical antenna group, and transmitting the transmission signal through the multiple physical antenna group.

The mapping of the baseband signal to the signal corresponding to the second virtual antenna group may include calculating at least one parameter associated with characteristics of the multiple physical antenna group, and mapping the baseband signal to the signal corresponding to the second virtual antenna group, based on the at least one parameter.

The mapping of the baseband signal to the signal corresponding to the second virtual antenna group may include mapping the baseband signal to the signal corresponding to the second virtual antenna group according to Equation below:

<Equation>

$$X_2 = P \cdot X_1$$

where $X_1$ is the baseband signal defined as the first virtual antenna group, $X_2$ is the signal defined as the second virtual antenna group, and P is a processing matrix determined based on at least one parameter associated with characteristics of the multiple physical antenna group.

In another aspect of the present invention, a method of receiving a signal by a receiver in a multiple antenna wireless communication system includes receiving a received signal corresponding to a multiple physical antenna group through the multiple physical antenna group, mapping the received signal to a signal corresponding to a second virtual antenna group, and mapping the signal corresponding to the second virtual antenna group to a baseband signal corresponding to a first virtual antenna group in order to remove coupling between antennas.

The mapping of the signal corresponding to the second virtual antenna group to the baseband signal may include calculating at least one parameter associated with characteristics of the multiple physical antenna group, and mapping the signal corresponding to the second virtual antenna group to the baseband signal, based on the at least one parameter.

The mapping of the signal corresponding to the second virtual antenna group to the baseband signal may include mapping the signal corresponding to the second virtual antenna group to the baseband signal according to Equation below:

<Equation>

$$X_1 = P \cdot X_2$$

where $X_1$ s the baseband signal defined as the first virtual antenna group, $X_2$ is the signal defined as the second virtual antenna group, and P is a processing matrix determined based on at least one parameter associated with characteristics of the multiple physical antenna group.

The at least one parameter may include at least one of a coupling value between the antennas and a signal response of each antenna.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

The configuration, operation and other features of the present invention will be understood by the embodiments of the present invention described with reference to the accompanying drawings.

Figure 1:
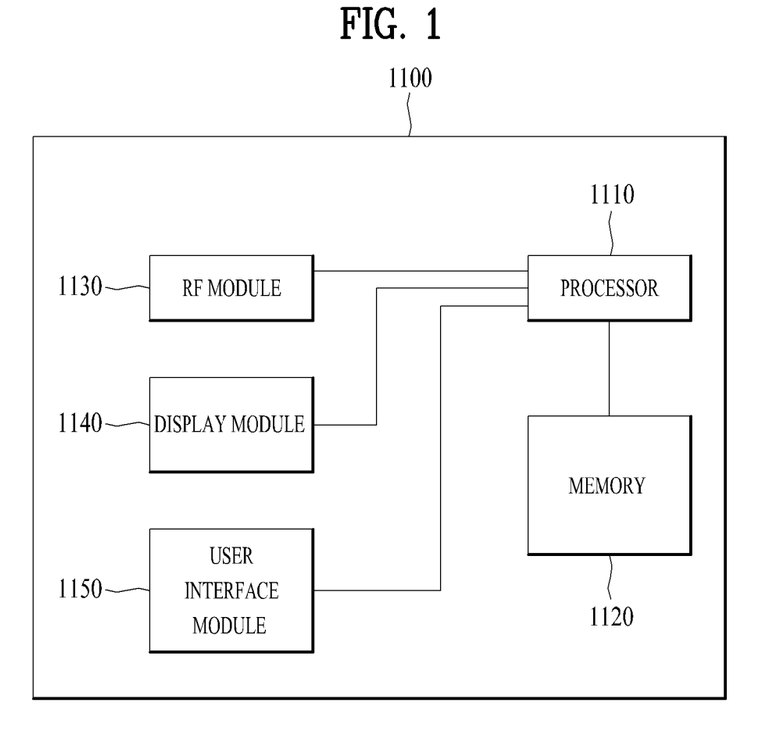
FIG. 1 is a block diagram of a stricture of a communication apparatus according to an embodiment of the present invention.

FIG. 1 is a block diagram of a stricture of a communication apparatus 100 according to an embodiment of the present invention.

Referring to FIG. 1, the communication apparatus 100 includes a processor 110, a memory 120, a radio frequency (RF) module 130, a display module 140, and a user interface module 150.

The communication apparatus 100 is shown for convenience of description and some modules thereof may be omitted. In addition, the communication apparatus 100 may further include necessary modules. In addition, some modules of the communication apparatus 100 may be subdivided.

The memory 120 is connected to the processor 110 so as to store an operating system, an application, program code, data and the like. The RF module 130 is connected to the processor 110 so as to perform a function of converting a baseband signal into a radio signal or converting a radio signal into a baseband signal. To this end, the RF module 130 performs analog conversion, amplification, filtering and frequency up-conversion or inverse processes thereof. The display module 140 is connected to the processor 110 so as to display a variety of information. As the display module 140, although not limited thereto, a well-known device such as a liquid crystal display (LCD), a light emitting diode (LED), or an organic light emitting diode (OLED) may be used. the user interface module 150 is connected to the processor 110 and may be configured by a combination of well-known user interfaces such as a keypad and a touch screen.

Now a description will be given of a multiple input multiple output (MIMO) system. MIMO may increase the transmission and reception efficiency of data by using a plurality of transmission (Tx) antennas and a plurality of reception (Rx) antennas. That is, with the use of multiple antennas at a transmitter or a receiver, MIMO may increase capacity and improve performance in a wireless communication system. The term "MIMO" is interchangeable with "multi-antenna".

MIMO technology does not depend on a single antenna path to receive a whole message. Rather, it completes the message by combining data fragments received through a plurality of antennas. MIMO may increase data rate within a cell area of a predetermined size or extend system coverage at a given data rate. In addition, MIMO may find its use in a wide range including mobile terminals, relays, etc. MIMO may overcome a limited transmission capacity encountered with conventional single-antenna technology in mobile communications.

Figure 2:
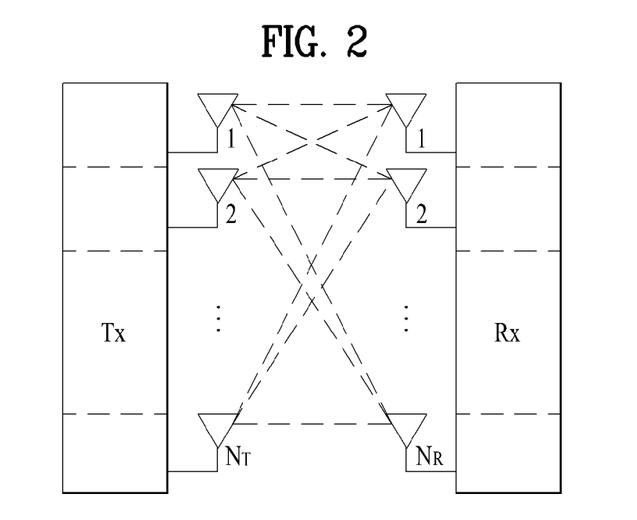
FIG. 2 illustrates the configuration of a typical multiple input multiple output (MIMO) communication system.

FIG. 2 illustrates the configuration of a typical MIMO communication system. Referring to HG. 2, a transmitter has $N_T$ Tx antennas and a receiver has $N_R$ Rx antennas. Simultaneous use of a plurality of antennas at both the transmitter and the receiver increases theoretical channel transmission capacity, compared to use of a plurality of antennas at only one of the transmitter and the receiver. The simultaneous use of a plurality of antennas at both the transmitter and the receiver increases theoretical channel transmission capacity, compared to use of a plurality of antennas at only one of the transmitter and the receiver. Thus, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. $R_i$ is the smaller value between $N_T$ and $N_R$.

$$R_i = \min(N_T, N_R) \tag{1}$$

For instance, a MIMO communication system with four Tx antennas and four Rx antennas may achieve a four-fold increase in theoretical transmission rate, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation Wireless Local Area Network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas as illustrated in FIG. 2 will be described in detail through mathematical modeling. Regarding a transmission signal, up to $N_T$ pieces of information can be transmitted through the $N_T$ Tx antennas, as expressed as the following vector.

$$s=[s_1, s_2, \ldots, s_{N_T}]^T \quad (2)$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as:

$$\hat{s}=[\hat{s}_1, \hat{s}_2, \ldots, \hat{s}_{N_T}]^T = [P_1 s_1, P_2 s_2, \ldots, P_{N_T} s_{N_T}]^T \quad (3)$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad (4)$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined by [Equation 5]. Herein, $w_{ij}$ denotes a weight between a $j^{th}$ piece of information and an $i^{th}$ Tx antenna and W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad (5)$$

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R) \quad (6)$$

A different piece of information transmitted in MIMO is referred to as 'transmission stream' or simply 'stream'. The 'stream' may also be called 'layer'. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad (7)$$

"#of streams" denotes the number of streams. Of note herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams is transmitted through a plurality of antennas, this may be spatial multiplexing. Needless to say, a hybrid scheme of spatial diversity and spatial multiplexing in combination may be contemplated.

Conventionally, in order to remove antenna coupling, various hardware methods have been considered. For example, efforts are underway to ensure independence between antennas by inserting an insulator between antennas, adding a separate RF circuit for removal of coupling, or using a new artificial material such as an insulator.

However, the aforementioned conventional method of removing antenna coupling is a method of removing coupling between physical antennas in an analog circuit. The present invention proposes a method and apparatus for removing coupling between virtual antennas in a digital circuit. Here, a logical antenna may be interpreted as an antenna port in digital processing and may also be referred to as a virtual antenna.

Figure 3:
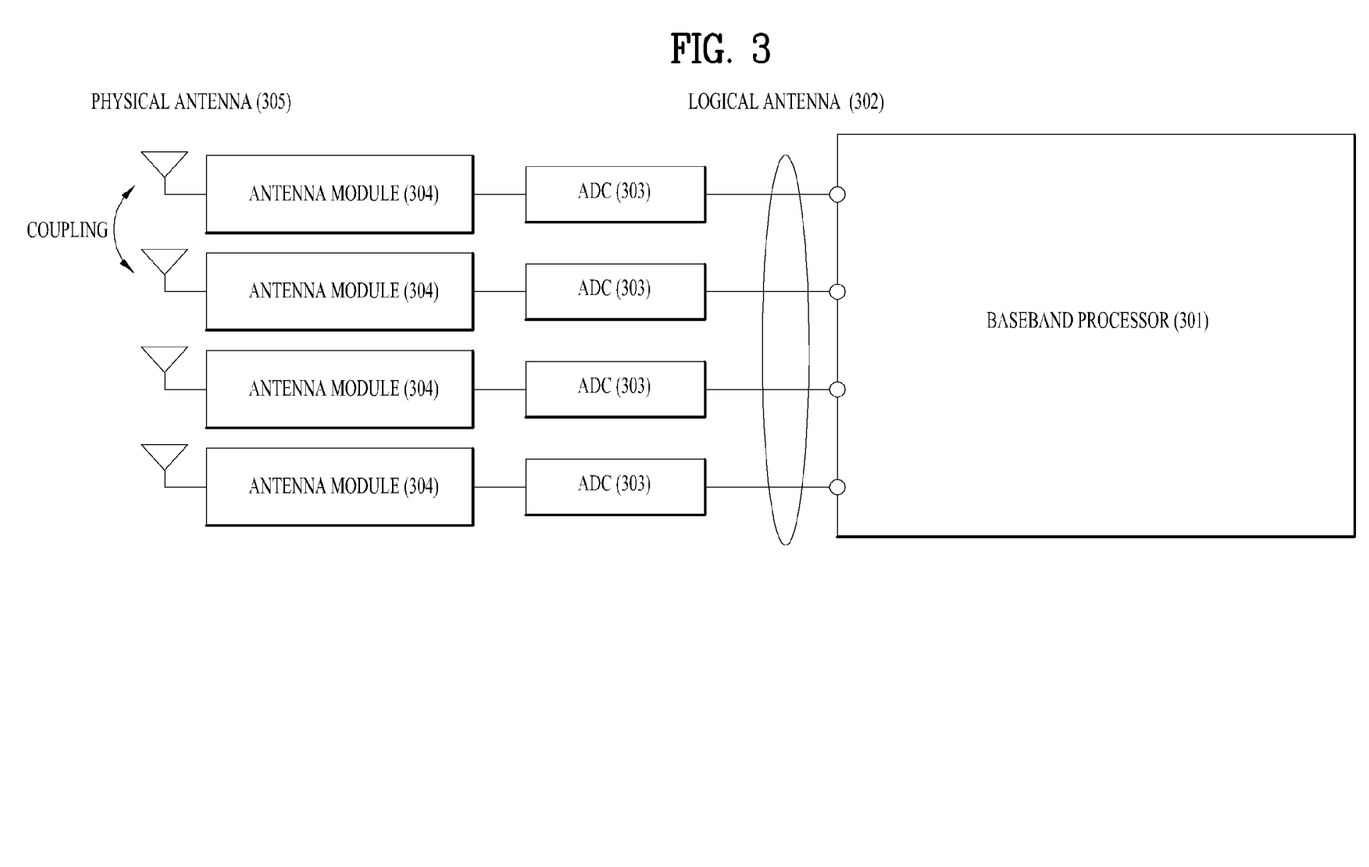
FIG. 3 is a diagram for explaining a concept of a logical antenna.

FIG. 3 is a digital for explaining a concept of a logical antenna 302.

Referring to FIG. 3, signals processed by a baseband processor 301 that performs digital processing are defined as a plurality of logical antennas 302 and are input to analog-digital converters 303, respectively. Here, the baseband processor 301 refers to a module that performs channel coding, modulation/demodulation, etc. In addition, the baseband processor 301 may correspond to the RF module 130 of FIG. 1, and thus, converts a baseband signal into a radio signal or converts a radio signal into a baseband signal. In addition, the ADC 303 refers to a device that converts a digital signal output from the baseband processor 301 into an analog signal.

In addition, analog signals converted by the ADCs 303 are processed, for example, amplified or phase-shifted by antenna modules 304, and then, are transmitted through a physical antenna 305. Here, the antenna module 304 may include a power amplifying module, a phase shifting module, a duplexer, a low-noise amplifier, etc.

Thus far, the present embodiment has been described in terms of a transmit procedure. However, in a receive procedure, an analog signal received from the physical antenna 305 is transmitted through the antenna module 304 and the ADCs 303, converted into a digital signal defined as the plural logical antennas 302, and processed by the baseband processor 301.

In general, a physical antenna and a logical antenna have a one-to-one or many-to-one mapping relationship. In an environment in which the number of physical antennas is limited, such as a cellular phone, generally, a physical antenna and a logical antenna have a one-to-one relationship, as illustrated in FIG. 3. However, when there are many physical antennas, such as a base station, a plurality of physical antennas may be connected to one logical antenna.

Figure 4:
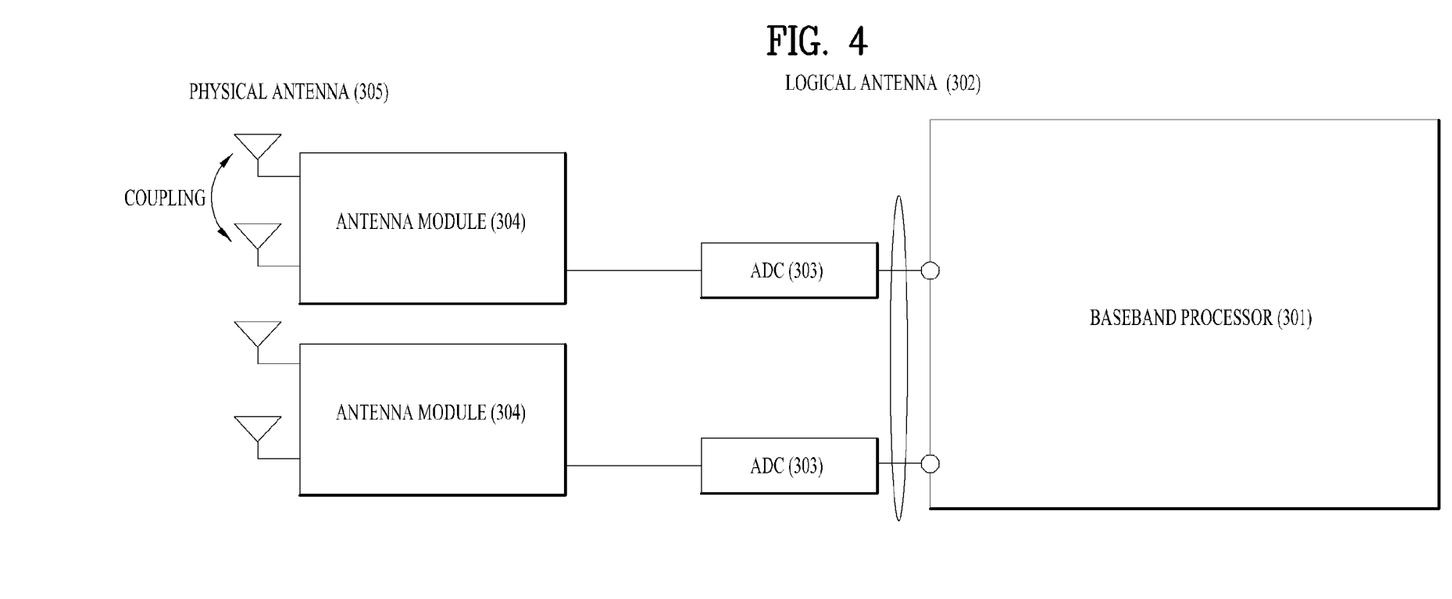
FIG. 4 is a diagram illustrating an example of mapping a plurality of physical antennas to one logical antenna.

FIG. 4 is a diagram illustrating an example of mapping a plurality of physical antennas to one logical antenna.

Referring to FIG. 4, signals processed by the baseband processor 301 are defined as two logical antennas 302 and input to ADCs 303, respectively. In addition, the analog signals converted by the ADCs 303 are processed in a predetermined manner and are transmitted through four physical antennas 305. That is, two physical antennas are mapped to one logical antenna.

As described above, coupling between physical antennas may be represented by coupling between logical antennas and induce various forms of performance deterioration such as interference increase, correlation increase, power attenuation, etc.

Thus, according to the present invention, a digital processor is further used to analyze logical/physical antennas and/or hardware features between a conventional baseband processor and an ADC to optimize the feature of the logical antenna, which will be described with reference to FIG. 5 in more detail.

Figure 5:
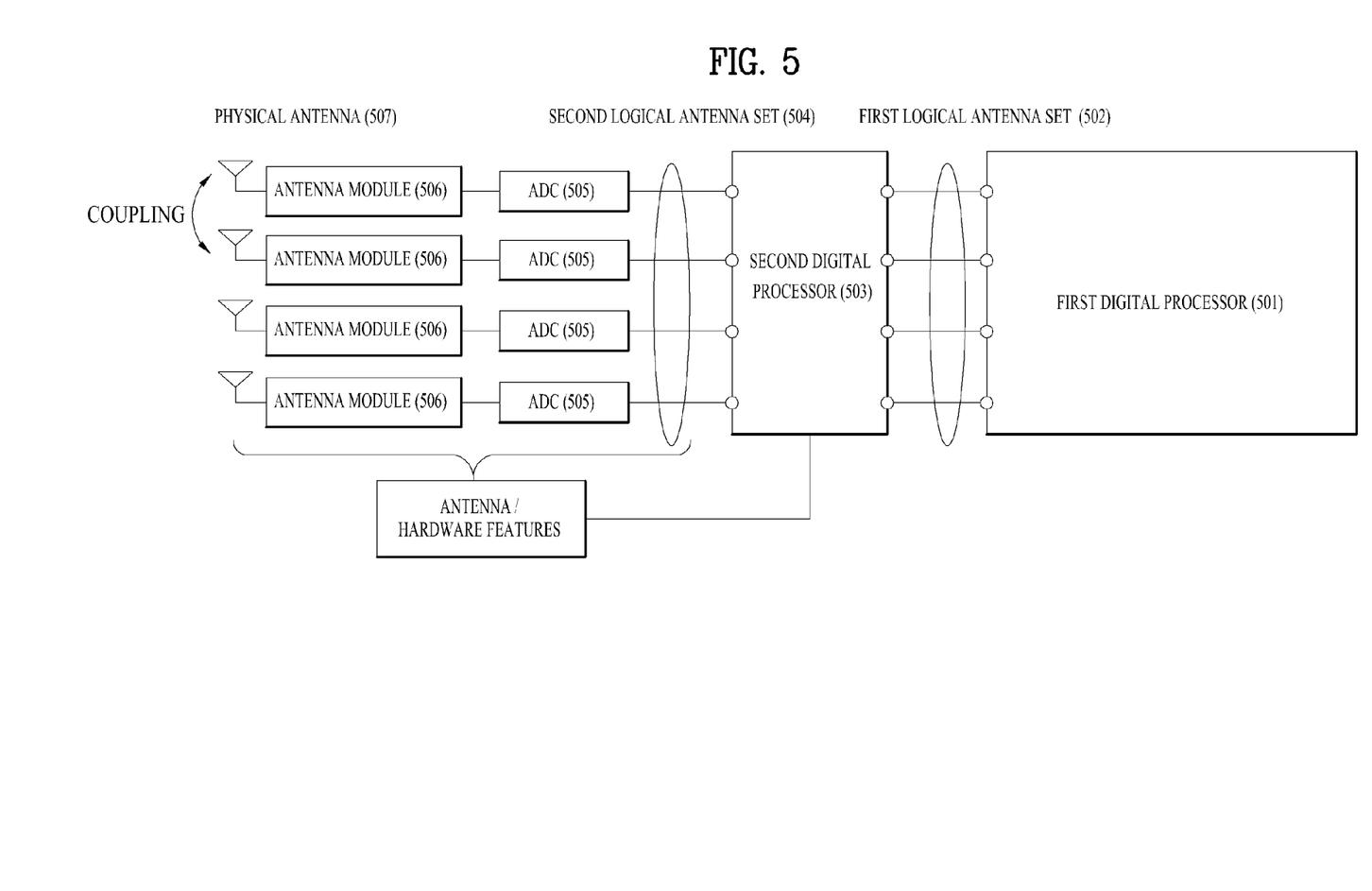
FIG. 5 is a diagram illustrating an example of a method of removing antenna coupling according to the present invention.

FIG. 5 is a diagram illustrating an example of a method of removing antenna coupling according to the present invention.

Referring to FIG. 5, a second digital processor 503 for performing digital processing for removal of coupling between antennas is further used in addition to a baseband processor or first digital processor 501 for performing channel coding, modulation/demodulation, etc.

In particular, in terms of transmission, the second digital processor 503 converts an existing first logical antenna group 502 defined by the first digital processor 501 into a second logical antenna group 504. In addition, in terms of reception, the second digital processor 503 may convert signals received through physical antennas 507, antenna modules 506, ADCs 505, and the second logical antenna group 504 into signals of the first logical antenna group 502 in order to input the received signal to the first digital processor 501.

Here, the second digital processor 503 according to the present invention is designed to form the first logical antenna group 502 having excellent features compared with the second logical antenna group 504. For example, when only the second logical antenna group 504 is used, performance reduction is serious due to coupling between physical antennas. However, the second digital processor 503 is defined to minimize performance reduction due to coupling between physical antennas using the first logical antenna group 502 reconfigured by the second digital processor 503.

For example, a digital processor is designed to measure influence of coupling between antennas in the second logical antenna group 504, influence of coupling between the physical antennas 507, or current leakage in the physical antennas 507 to perform de-coupling.

In detail, the second digital processor 503 according to the present invention has a parameter related to antenna and/or hardware features as an input of a processor design, and has unchanged configuration and functions as long as the antenna and hardware features are not changed. That is, a processing scheme may be changed according to the number (the number of the first logical antennas in FIG. 5) or characteristics of logical antenna ports defined by the first digital processor 501, but may be predetermined according to a given physical/logical antenna and hardware features.

In addition, the parameter related to the antenna and/or hardware features may be measured by the proposed processor, or alternatively, may be designed as a value that is input as a value measured by a separate device. In addition, the parameter related to the antenna and/or hardware features may be interpreted as including various antenna and hardware features such as a coupling degree between antennas, a signal response of each antenna, an RF parameter, etc.

As an example of processing performed by the second digital processor 503, a linear system for converting the first logical antenna group 502 and the second logical antenna group 504 into a matrix represented by Equation 8 below may be considered.

$$X_2 = P \cdot X_1 \qquad (8)$$

In Equation 8 above, $X_1$ is a first logical antenna vector, that is, signals defined by a first logical antenna group, $X_2$ is a second logical antenna vector, that is, signals defined by a second logical antenna group, and P is a processing matrix. In particular, the processing matrix P is determined based on measured antenna/hardware features.

The second digital processor 503 proposed according to the present invention may have various effects such as reduction in correlation between physical (or logical) antennas, interference reduction, increase in power efficiency, increase in channel capacity, etc. as well as reduction in coupling between antennas. That is, the second digital processor 503 may be referred to as a processor for optimization of logical antennas.

According to the aforementioned embodiments, the second digital processor 503 is independently embodied from the first digital processor 501 as a baseband processor. Alternatively, the first digital processor 501 and the second digital processor 503 may be integrated into one processor.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

According to the embodiments of the present invention, coupling between antennas in a multi-antenna based wireless communication system may be effectively removed. In particular, according to the embodiments of the present invention, influence of coupling between antennas in an environment in which a plurality of Tx antennas are geographically clustered may be minimized.

It will be appreciated by persons skilled in the art that the effects that can be achieved with the present invention are not limited to what has been particularly described hereinabove and other advantages of the present invention will be more clearly understood from the following detailed description.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A communication apparatus in a multi-antenna wireless communication system, the communication apparatus comprising:
    a first processor configured to process a first signal corresponding to a first virtual antenna group, wherein the first signal is a baseband signal;
    a second processor configured to:
        calculate at least one parameter associated with characteristics of a physical antenna group, and
        map the first signal corresponding to the first virtual antenna group to a second signal corresponding to a second virtual antenna group using a processing matrix determined based on the at least one parameter, wherein the at least one parameter comprises at least one of a signal response of each of a plurality of antennas in the physical antenna group and a coupling value between the antennas in the physical antenna group;
    an antenna module configured to map the second signal corresponding to the second virtual antenna group to a third signal corresponding to the physical antenna group; and
    a measuring module configured to:
        identify the characteristics of the physical antenna group, and
        provide information on the identified characteristics of the physical antenna group to the second processor.

2. The communication apparatus according to claim 1, wherein the second processor maps the first signal corresponding to the first virtual antenna group to the second signal corresponding to the second virtual antenna group according to Equation below:
<Equation>

$$X_1 = P \cdot X_2,$$

where $X^1$ is the first signal corresponding to the first virtual antenna group, $X^2$ is the second signal corresponding to the second virtual antenna group, and P is the processing matrix.

3. A method of transmitting a signal by a transmitter in a multiple antenna wireless communication system, the method comprising:
    generating a first signal corresponding to a first virtual antenna group, wherein the first signal is a baseband signal;
    identifying characteristics of a physical antenna group;
    calculating at least one parameter associated with the identified characteristics of the physical antenna group;
    mapping the first signal corresponding to the first virtual antenna group to a second signal corresponding to a second virtual antenna group using a processing matrix determined based on the at least one parameter, wherein the at least one parameter comprises at least one of a signal response of each of a plurality of antennas in the physical antenna group and a coupling value between the antennas in the physical antenna group;
    mapping the second signal corresponding to the second virtual antenna group to a third signal corresponding to a physical antenna group; and
    transmitting the third signal through the physical antenna group.

4. The method according to claim 3, wherein the first signal corresponding to the first virtual antenna group is mapped to the second signal corresponding to the second virtual antenna group according to Equation below:
<Equation>

$$X_1 = P \cdot X_2,$$

where $X_1$ is the first signal corresponding to the first virtual antenna group, $X_2$ is the second signal corresponding to the second virtual antenna group, and P is the processing matrix.

5. A method of receiving a signal by a receiver in a multiple antenna wireless communication system, the method comprising:
    receiving a first signal corresponding to a physical antenna group through the physical antenna group;
    mapping the first signal corresponding to the physical antenna group to a second signal corresponding to a first virtual antenna group;
    identifying characteristics of the physical antenna group;
    calculating at least one parameter associated with the identified characteristics of the physical antenna group, wherein the at least one parameter comprises at least one of a signal response of each of a plurality of antennas in the physical antenna group and a coupling value between the antennas in the physical antenna group; and
    mapping the second signal corresponding to the first virtual antenna group to a third signal corresponding to a second virtual antenna group using a processing matrix determined based on the at least one parameter, wherein the third signal is a baseband signal.

6. The method according to claim 5, wherein the second signal is corresponding to the first virtual antenna group mapped to the third signal corresponding to the second virtual antenna group according to Equation below:
<Equation>

$$X_1 = P \cdot X_2,$$

where $X_1$ is the third signal corresponding to the second virtual antenna group, $X_2$ is the second signal corresponding to the first virtual antenna group, and P is the processing matrix.

7. A communication apparatus in a multi-antenna wireless communication system, the communication apparatus comprising:
    a processor configured to:

process a first signal corresponding to a first virtual antenna group, wherein the first signal is a baseband signal, calculate at least one parameter associated with characteristics of a physical antenna group, and map the first signal corresponding to the first virtual antenna group to a second signal corresponding to a second virtual antenna group using a processing matrix determined based on the at least one parameter, wherein the at least one parameter comprises at least one of a signal response of each of a plurality of antennas in the physical antenna group and a coupling value between the antennas in the physical antenna group;

an antenna module configured to map the second signal corresponding to the second virtual antenna group to a third signal corresponding to the physical antenna group; and a measuring module configured to:
identify the characteristics of the physical antenna group, and provide information on the identified characteristics of the physical antenna group to the processor.

* * * * *